US011884874B2

(12) United States Patent
Stone

(10) Patent No.: US 11,884,874 B2
(45) Date of Patent: Jan. 30, 2024

(54) BENTONITE-BASED GROUTS AND RELATED METHODS

(71) Applicant: HALLIBURTON ENERGY SERVICES, INC., Houston, TX (US)

(72) Inventor: Shantel Jeanette Stone, Conroe, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/654,125

(22) Filed: Mar. 9, 2022

(65) Prior Publication Data

US 2022/0195283 A1 Jun. 23, 2022

Related U.S. Application Data

(63) Continuation-in-part of application No. 16/639,266, filed as application No. PCT/US2017/061557 on Nov. 14, 2017, now abandoned.

(51) Int. Cl.
*C09K 8/504* (2006.01)
*C04B 14/10* (2006.01)
(Continued)

(52) U.S. Cl.
CPC .......... *C09K 8/5045* (2013.01); *C04B 14/104* (2013.01); *C04B 22/103* (2013.01); *E21B 33/14* (2013.01); *C04B 2111/70* (2013.01)

(58) Field of Classification Search
CPC ............. C04B 2201/32; C04B 2111/70; C04B 2103/408; C04B 2103/22; C04B 22/124;
(Continued)

(56) References Cited

U.S. PATENT DOCUMENTS 4,964,918 A 10/1990 Brown et al.
5,389,146 A 2/1995 Liao
(Continued)

FOREIGN PATENT DOCUMENTS

EP 0774446 A1 5/1997
EP 2480511 A1 8/2012
(Continued)

OTHER PUBLICATIONS

Machine translation of KR 2005/0067972 (Year: 2005).*
(Continued)

*Primary Examiner* — Angela M DiTrani Leff

(74) *Attorney, Agent, or Firm* — Conley Rose, P.C.; Rodney B. Carroll

(57) ABSTRACT

Bentonite-based grout fluids and methods of using the grout fluids are provided. A method of using a grout fluid includes placing a geothermal conduit in at least one hole in the earth, providing a grout fluid consisting essentially of water and a bentonite-based grout, wherein the bentonite-based grout consists essentially of calcium carbonate, a bentonite, one or more grout-setting modifiers, and one or more thermally conductive materials, introducing the grout fluid into a space between the geothermal conduit and sidewalls of the at least one hole so that the grout fluid is in contact with the geothermal conduit, and after introducing the grout fluid,
(Continued)

300

Provide a grout fluid consisting essentially of water and a bentonite-based grout, wherein the bentonite-based grout consists essentially of calcium carbonate, a bentonite, and one or more grout-setting modifiers — 302

Introduce the grout fluid into a borehole so that the grout fluid is in contact with sidewalls of the borehole and fills the borehole — 304

Allow the grout fluid to set in the borehole, wherein after setting, the grout fluid has a hydraulic conductivity of between about $1 \times 10^{-7}$ cm/s and $1 \times 10^{-9}$ cm/s — 306 allowing the grout fluid to set to fix the geothermal conduit to the at least one hole, wherein after setting, the grout fluid has a hydraulic conductivity of between about $1\times10^{-7}$ cm/s and about $1\times10^{-9}$ cm/s.

23 Claims, 4 Drawing Sheets

(51) Int. Cl.
    *C04B 22/10*     (2006.01)
    *E21B 33/14*     (2006.01)
    *C04B 111/70*     (2006.01)

(58) Field of Classification Search
    CPC ....... C04B 22/147; C04B 14/28; C04B 22/16; C04B 28/00; C04B 22/08; C09K 8/504; C09K 8/5045; C09K 8/508; C09K 8/506; C09K 8/467; E21B 33/13; E21B 33/14
    See application file for complete search history.

(56) References Cited

U.S. PATENT DOCUMENTS

| | | | |
|---|---|---|---|
| 5,830,831 A | 11/1998 | Chan et al. | |
| 6,105,674 A | 8/2000 | Liao et al. | |
| 6,251,179 B1 | 6/2001 | Allan | |
| 6,258,160 B1 | 7/2001 | Chatterji et al. | |
| 6,502,636 B2 * | 1/2003 | Chatterji | C04B 28/18 |
| | | | 405/266 |
| 7,067,004 B2 | 6/2006 | Matula et al. | |
| 7,452,417 B2 | 11/2008 | Matula et al. | |
| 7,938,904 B1 | 5/2011 | Wiggs | |
| 8,851,746 B2 | 10/2014 | Collins et al. | |
| 9,062,240 B2 | 6/2015 | Frantz et al. | |
| 9,121,630 B1 | 9/2015 | Fraim | |
| 9,187,612 B2 | 11/2015 | Grivei et al. | |
| 2006/0243166 A1 * | 11/2006 | Matula | C04B 28/105 |
| | | | 106/638 |
| 2007/0125274 A1 * | 6/2007 | Miller | C04B 28/02 |
| | | | 106/638 |
| 2011/0305820 A1 * | 12/2011 | Kadrmas | C08L 95/005 |
| | | | 427/8 |
| 2011/0305830 A1 * | 12/2011 | Frantz | C09K 8/467 |
| | | | 427/230 |
| 2012/0195689 A1 | 8/2012 | Konczak | |
| 2012/0247766 A1 | 10/2012 | Hemmings | |
| 2014/0014341 A1 | 1/2014 | Hathcox et al. | |
| 2015/0125646 A1 | 5/2015 | Tournilhac et al. | |
| 2015/0291477 A1 | 10/2015 | Bai et al. | |
| 2017/0058181 A1 * | 3/2017 | Frantz | F24T 10/10 |
| 2022/0019528 A1 | 1/2022 | Wang et al. | |
| 2022/0154072 A1 * | 5/2022 | Pengelly | E02D 3/005 |

FOREIGN PATENT DOCUMENTS

| | | | |
|---|---|---|---|
| JP | 2009001446 A | 1/2009 | |
| JP | 2010159378 A | 7/2010 | |
| KR | 20050067972 A * | 5/2005 | |
| WO | WO 95/31415 A1 | 11/1995 | |
| WO | WO 2007/141507 A1 | 12/2007 | |
| WO | WO 2015/021694 A1 | 2/2015 | |
| WO | WO 2016/175774 A1 | 11/2016 | |
| WO | WO 2016/180999 A1 | 11/2016 | |
| WO | 2019098994 A1 | 5/2019 | |
| WO | WO-2019177657 A1 * | 9/2019 | ........... C04B 14/024 |

OTHER PUBLICATIONS

Hole Products Anywhere, Barotherm Gold, retrieved Mar. 13, 2023 from https://www.holeproducts.com/BAROTHERM-GOLD-1.0-50LB (Year: 2023).*

Quik-Gel, retrieved Mar. 13, 2023 from https://www.baroididp.com/en/products/quik-gel (Year: 2023).*

International Search Report and Written Opinion issued for International Application No. PCT/US2017/061557, dated Aug. 8, 2018, ISA/KR, 15 pages.

Muge Elif Orakoglu, JianKun Liu: "Thermal conductivity of reinforced soils: A literature review," Sciences in Cold And Arid Regions, 6 (4), Aug. 2014, pp. 409-414, 7 pages.

Daehoon Kim et al.: "Changes in the thermal conductivity of bentonite-based grouts with varying volumetric water content," Geosystem Engineering, 2013, 16 (4), pp. 257-264, 9 pages.

Abd Elatty, A. S., El-Nahhas, F. M., El-Mossallamy, Y. M., and El-Baz, A. M.: "Effect of surrounding soil thermal conductivity on the effective pipe-to-borehole thermal resistance in vertical ground heat exchangers," Zaytoonah University International Engineering Conference on Design and Innovation in Infrastructure 2012 (ZEC Infrastructure 2012), Jun. 18-20, 2012, Amman, Jordan, 28 pages.

Daehoon Kim, Gyoungman Kim, Hwanjo Baek: "Relationship between thermal conductivity and soil-water characteristic curve of pure bentonite-based grout," International Journal of Heat and Mass Transfer, 84 (2015), pp. 1049-1055, 7 pages.

Byong Hu Sohn, Hyun-Joon Shin: "Thermal Conductivity Measurement of Grouting Materials for Ground Heat Exchanger Borehole," Korean Journal of Air-Conditioning and Refrigeration Engineering 18 (6), 2006, pp. 493-500.

Sohn, Byonghu; Park, Sangwoo; Choi, Hangseok; Wi, Jihae: and Lim, Jeehee: "Evaluation of Conventional Prediction Models for Soil Thermal Conductivity to Design Horizontal Ground Heat Exchangers," Journal of the Korean Geotechnical Society 29 (2), pp. 5-14, 11 pages.

Tracy Brettmann, Tony Amis: "Thermal Conductivity Evaluation of a Pile Group Using Geothermal Energy Piles," Geo-Frontiers 2011, ASCE 2011, pp. 499-508, 10 pages.

Park, Moon-Seo; Lee, Chul-Ho; Kang, Shin-Hyung; Wi, Ji-Hae; and Choi, Hang-Seok: "Study on Cement-based Grout for Closed-loop Vertical Grout Heat Exchanger," Journal of the Korean Geotechnical Society, 26 (7), pp. 107-115, 9 pages.

S. E. Silliman, C. E. Neuzil: "Borehole Determination of Formation Thermal Conductivity Using a Thermal Pulse From Injected Fluid," Journal of Geophysical Research, vol. 95, No. B6, pp. 8697-8704, Jun. 10, 1990, 8 pages.

Hangseok Choi: Chulho Lee: Hujeong Gil; Hyopum Choi; and Sang-Baik Woo: "Experimental Study on Thermal Conductivity and Viscosity of Grouts for Backfilling Ground Heat Exchanger," The Korean Society for New and Renewable Energy (2007), pp. 529-532, 4 pages.

Choi, Hang-Seok; Choi, Hyo-Pum; Lee, Chul-Ho; and Woo, Sang-Baik: "A Study on the Physical Characteristics of Grout Material for Backfilling Ground Heat Exchanger," Journal of the Korean Geotechnical Society, 24 (1), pp. 37-49, 13 pages.

A. A. Alrtimi; M. Rouainia; and D. A. C. Manning: "Thermal enhancement of PFA-based grout for geothermal heat exchangers," Applied Thermal Engineering 54 (2013), pp. 559-564, 6 pages.

Marita Allan and Aristodimos Philippacopoulos: "Performance Characteristics and Modelling of Cementitious Grouts for Geothermal Heat Pumps," Proceedings World Geothermal Congress, 2000, Kyushu-Tohokum Japan, May 28-Jun. 10, 2000, pp. 3355-3360, 6 pages.

Tolga Ozudogru; Tracy Brenttmann; C. Guney Olgun; James R. Martin II; and Aykut Senol: "Thermal Conductivity Testing of Energy Piles: Field Testing and Numerical Modeling," GeoCongress 2012, ASCE 2012, pp. 4436-4445, 11 pages.

Roque Borinaga-Treviño; Pablo Pascual-Muñoz; Miguel Ángel Calzada-Pérez; and Daniel Castro-Fresno: "Freeze-thaw durability of cement-based geothermal grouting materials," Construction and Building Materials 55 (2014), pp. 390-397, 8 pages.

Bai, Kang: "Thermal Conductive Characteristics and Basic Properties of Bentonite Grouts for the Ground Heat Exchanger of Geo-source Heat Pump," Journal of the Korean Solar Energy Society, vol. 33, No. 1, 2013, pp. 66-72, 7 pages.

Chulho Lee; Kangja Lee; Hangseok Choi; and Hyo-Pum Choi: "Characteristics of thermally-enhanced bentonite grouts for geothermal heat exchanger in South Korea," Science China, Technological Sciences, vol. 53, No. 1, pp. 123-128, 6 pages.

(56) References Cited

OTHER PUBLICATIONS

Lei Yang; Jiafei Zhao; Weiguo Liu; Mingjun Yang; and Yongchen Song: "Experimental study on the effective thermal conductivity of hydrate-bearing sediments," Energy 79 (2015), pp. 203-211, 9 pages.

Lee, Chulho; Min, Sunhong; Sohn, Byonghu; Park, Moonseo; and Choi, Hangseok: "Evaluation of Performance of Grouts and Pipe Sections for Closed-loop Vertical Ground Heat Exchanger by In-situ Thermal Response Test," Journal of the Korean Society, 26 (7), 2010, pp. 93-106, 14 pages.

Roque Borinaga-Treviño; Pablo Pascual-Muñoz; Daniel Castro-Fresno; and Juan José Diaz: "Study of different grouting materials used in vertical geothermal closed-loop heat exchangers," Applied Thermal Engineering 50 (2013), pp. 159-167, 9 pages.

Chulho Lee; Hujeong Gil; Kangja Lee; Hangseok Choi; and Hyopum Choi: "Chemical and Physical Influence Factors on Performance of Bentonite Grouts for Backfilling Ground Heat Exchanger," Fall National Conference 2008, Oct. 10-11, 2008, Gwangju, Korea, pp. 1475-1486, 12 pages.

Chulho Lee; Moonseo Park; Sunghong Min; Shin-Hyung Kang; Byonghu Sohn; and Hangseok Choi: "Comparison of effective thermal conductivity in closed-loop vertical ground heat exchangers," Applied Thermal Engineering 31 (2011), pp. 3669-3676, 8 pages.

Guanming Yuan; Xuanke Li; Zhijun Dong; Xiaoqing Xiong; Brian Rand; Zhengwei Cuil Ye Cong; Jiang Zhang; Yanjun Li; Zhongwei Zhang; and Junshan Wang: "Pitch-based ribbon-shaped carbon-fiber-reinforced one-dimensional carbon/carbon composites with ultrahigh thermal conductivity," Carbon 68 (2014), pp. 413-425, 13 pages.

Han, Eunseon; Choi, Hyun-Jun; Lee, Chulho; Choi, Hangseok: "Study on Evaluation of Effective Thermal Conductivity of Unsaturated Soil Using Average Capillary Pressure and Network Model," Journal of the Korean Geotechnical Society, 29 (1), pp. 93-107, 15 pages.

O. B. Ozger; F. Girardi; G. M. Giannuzzi; V. A. Salomoni; C. E. Majorana; L. Fambri; N. Baldassino; R. Di Maggio: "Effect of nylon fibres on mechanical and thermal properties of hardened concrete for energy storage systems," Materials and Design 51 (2013), pp. 989-997, 9 pages.

Michael Jobmann and Gunter Buntebarth: "Influence of graphite and quartz addition on the thermo-physical properties of bentonite for sealing heat-generating radioactive waste," Applied Clay Science 44 (2009), pp. 206-210, 5 pages.

Fabien Delaleux, Xavier Py, Régis Olives, Antoine Dominguez: "Enhancement of geothermal borehole heat exchangers performances by improvement of bentonite grouts conductivity," Applied Thermal Engineering 33-34 (2012), pp. 92-99, 8 pages.

Ekrem Kalhan and Suat Akbulut: "The positive effects of silica fume on the permeability, swelling pressure and compressive strength of natural clay liners," Engineering Geology 73 (2004), pp. 145-156, 12 pages.

Haluk Akgün: "Geotechnical characterization and performance assessment of bentonite/sand mixtures for underground waste repository sealing," Applied Clay Science 49 (2010), pp. 394-399, 6 pages.

Dr. Donald A. Bruce; Trent L. Dreese; and Douglas M. Heenan: "Concrete Walls and Grout Curtains in the Twenty-First Century: The Concept of Composite Cut-Offs for Seepage Control."

Siow Chun Lim; Chandima Gomes; and Mohd Zainal Abidin Ab Kadir: "Characterizing of Bentonite with Chemical, Physical and Electrical Perspectives for Improvement of Electrical Grounding Systems," International Journal of Electrochemical Science, 8 (2013), pp. 11429-11447, 20 pages.

Mohammad Heidarzadeh: Ali A. Mirghasemi; and S. M. Etemadzadeh: "Experimental Study of Chemical Grouting of Conglomerate Foundations," International Journal of Civil Engineering, vol. 5, No. 1, Mar. 2007, pp. 66-83.

Valentin Wagner; Philipp Blum; Markus Kubert; and Peter Bayer: "Analytical approach to groundwater- influenced thermal response tests of grouted borehole heat exchangers," Geothermics 46 (2013), pp. 22-31.

P. Patton; S. Day; and M. Byle: "Compatibility Evaluation of Groundwater Cutoff Wall Using Salt-Resistant Bentonite and BFS/Cement for Deep-Mix Barrier Wall," GEO-Denver 2007: New Peaks in Geotechnics; ASCE 2007; GSP 172 Soil Improvement; pp. 1-11.

Pradeep Jain; Jon Powell; Timothy G. Townsend; and Debra R. Reinhart, "Estimating the Hydraulic Conductivity of Landfilled Municipal Solid Waste Using the Borehole Permeameter Test," Journal of Environmental Engineering, 2006, 132 (6), pp. 645-652, 8 pages.

H. Akgün; M. K. Koçkar; Ö. Aktürk: "Evaluation of a compacted bentonite/sand seal for underground waste repository isolation," Environmental Geology, 2006, 50 (3), pp. 331-337, 8 pages.

Mahmood R. Abdi; Ali Parsapajouh; and Mohammad A. Arjomand: "Effects of Random Fiber Inclusion on Consolidation, Hydraulic Conductivity, Swelling, Shrinkage Limit and Desiccation Cracking of Clays," International Journal of Civil Engineering, vol. 6, No. 4, Dec. 2008, pp. 284-292, 9 pages.

Erik I. Anderson, Elizabeth Mesa: "The effects of vertical barrier walls on the hydraulic control of contaminated groundwater," Advances in Water Resources 29 (2006), pp. 89-98, 10 pages.

Tuncer B. Ebdil, Ahmed S. H. Muhanna, "Characteristics of a bentonite slurry as a sealant," Geotechnical Testing Journal 15 (1), pp. 3-13, 11 pages.

K. Venkat Raman; P. Dayakar; Dr. K. V. B. Raju: "Effect of permeation grouting using cement bentonite grout in sandy soil," International Journal of Engineering Trends and Technology (IJETT), vol. 3, Issue 5, No. 3, Sep. 2012, pp. 40-49, 10 pages.

Examination Report for British Patent Application No. 2003919.4, issued by the Intellectual Property Office, dated Feb. 17, 2022, (2 pgs.).

Foreign Communication from Related Application—Great Britain Combined Search and Examination Report, regarding GB 2216208.5, dated May 2, 2023, 6 pages.

* cited by examiner

BENTONITE-BASED GROUTS AND RELATED METHODS

CROSS-REFERENCE TO RELATED APPLICATIONS

The present application is a continuation-in-part application of U.S. application Ser. No. 16/639,266 filed on Feb. 14, 2020, which is a U.S. National Stage patent application of International Patent Application No. PCT/US2017/061557, filed on Nov. 14, 2017, the benefit of which is claimed and the disclosure of which is incorporated herein by reference in its entirety.

BACKGROUND

The present disclosure relates generally to grout fluids, and to methods of using the grout fluids in geothermal grout systems, well abandonment applications, and annular sealant applications. In particular, the present disclosure relates to grout fluids having a reduced concentration of grout, and methods of using the grout fluids.

Grouting is the process of placing an effective seal in a hole. The sealing agents used are generally known as grouts. To be effective, they must be easy to put in place and must have low permeability to limit the migration of contaminants to the subsurface.

Generally, the objective of proper grouting is to replace the native material removed during drilling with a product that meets or exceeds the sealing capability of the native material removed. A hole (e.g., a borehole) provides a conduit for contamination from the surface to the subsurface.

Although there are multiple formulations for grouts throughout the industrial drilling industries, the grout to water ratio has remained fairly consistent. Grout fluids generally have a high solids content, e.g., about 28% to about 72% total solids by weight. Grout fluids have likely not changed due to the presumption that a lower solids content would cause the grout fluid to no longer meet the required industry permeability standard. Users in the field, however, would greatly benefit from mixing lower concentrations of grout with water.

Thus, there is a continuing need for improved grout fluids and methods for geothermal and sealing applications.

BRIEF DESCRIPTION OF THE DRAWINGS

The following figures are included to illustrate certain aspects of the present invention, and should not be viewed as an exclusive embodiment. The subject matter disclosed is capable of considerable modification, alteration, and equivalents in form and function, as will occur to those of ordinary skill in the art and having the benefit of this disclosure.

DETAILED DESCRIPTION

Figure 1:
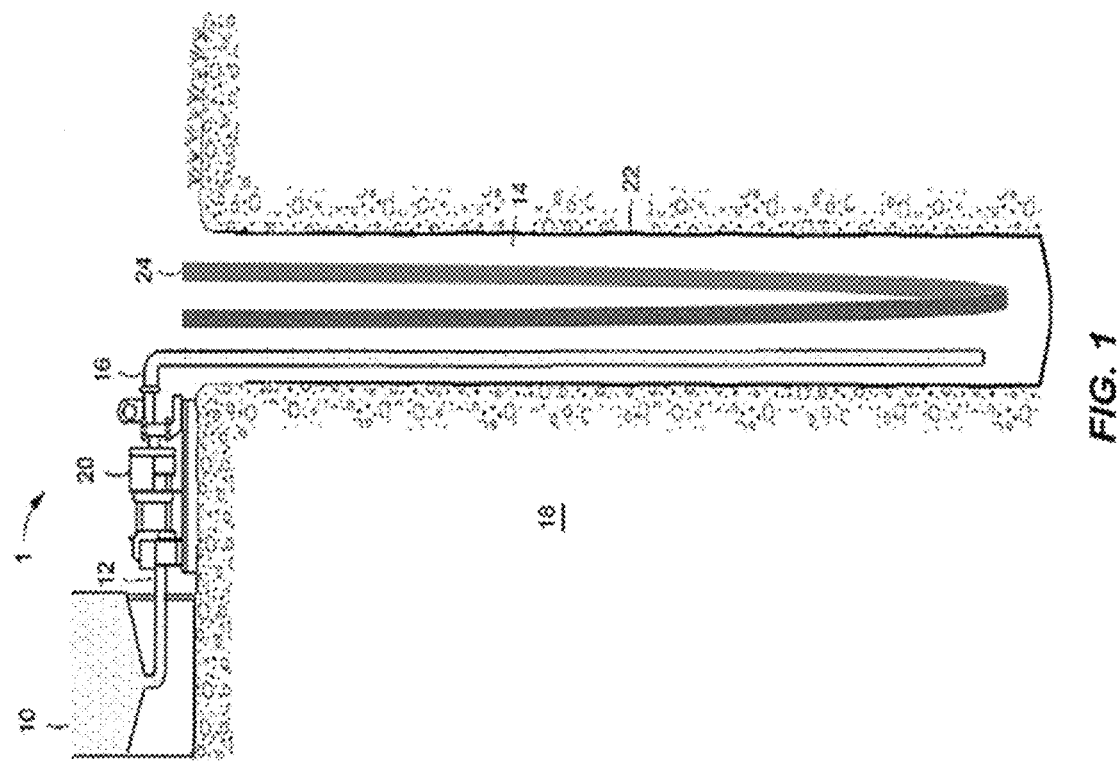
FIG. 1 illustrates a schematic of a system configured to deliver a grout fluid of the present disclosure to a downhole location for grouting a geothermal well loop, according to one or more embodiments.

Grout fluids are provided having a significant reduction in the concentration of bentonite-based grout. As used herein, "bentonite-based grout" refers to a grout having at least 60 percent by weight bentonite based on the total weight of the grout and excluding any cementitious material or thermally insulative material. As used herein, "cementitious material" means a material that may be mixed with a liquid, such as water, to form a plastic paste and hardens, or that hardens under dry conditions. Cementitious materials include, without limitation, hydraulic cements and non-hydraulic cements. Calcium carbonate is not a cementitious material since it does not form a paste with water and harden, or harden under dry conditions. When mixed with water, calcium carbonate dissolves sparingly.

In one or more embodiments, addition of cementitious materials to the bentonite-based grout adversely affects the properties of the grout. For example, the cementitious material contaminates the bentonite and can reduce the density of the grout or the grout fluid prepared from the grout. In addition, the cementitious material competes with bentonite in the grout for water. Particularly in geothermal applications, combinations of bentonite and cementitious material are not beneficial. The ultimate purpose of a grout is to act as a sealant, for example, to seal a well.

In geothermal application, the grout needs to seal the well to prevent surface contaminants from flowing into the geology and/or the water table. Geothermal grouts must seal the well as well as suspend thermally conductive material for enhancement of geothermal heat loops. Cementitious materials and the prevalent calcium in cement are well-known contaminants to bentonite, desiccating the bentonite, and ultimately impacting the sealing/bonding of the grout in the well. The grout will "shrink" in the presence of cementitious materials, and therefore the grout will not bond or seal the well. Consequently, the well is allowed to "leak" or allow contaminants to flow from the surface to the formation, and potentially into the water table.

In an example, a bentonite-based grout may include at least about 65 weight percent bentonite, at least about 70 weight percent bentonite, or at least about 75 weight percent bentonite, based on the total weight of the grout. As used herein, "grout" refers to the total solids content present in the grout fluid. For example, the typical concentration of bentonite-based grout in grout fluids is about 50 pounds of grout in about 14-22 gallons of water. In one or more embodiments, the concentration of bentonite-based grout is reduced so that it is about 15 pounds of grout per about 11.5 gallons of water, about 15 pounds of grout per about 27 gallons of water, about 25 pounds of grout per about 11.5 gallons of water, or about 25 pounds of grout per about 27 gallons of water, including all the values in between these concentrations. In one or more embodiments, the bentonite-based grout concentration is reduced to about 25 pounds of grout per about 14 gallons of water, or about 25 pounds of grout per about 20 gallons of water, including all the values in between these concentrations. In one or more embodiments, the bentonite-based grout concentration is about 0.5 pounds of grout per gallon of water to about 2.2 pounds of grout per gallon of water. In one or more embodiments, the concentration of bentonite-based grout is reduced to about 50 pounds of grout per about 30 to about 50 gallons of water, or about 1 pound of grout per gallon of water to about 1.7 pounds of grout per gallon of water. Advantageously, this reduction in grout concentration does not significantly impact grout properties such as permeability, suspension, slurry volume yield, grout consistency (or "set"), and fluidity or pumpability.

The grout fluids of the present disclosure may be used in a variety of applications. For example, the grout fluids may be used in geothermal applications, abandonment applications, and sealant applications. As further discussed below, the grout fluids can be formulated so as to reduce the grout concentration by about half the typical usage while maintaining the expected and intended properties of an industry standard grout. The applications generally include placing a conduit in at least one hole formed in the earth, and contacting the conduit with the grout fluid. The hole in the earth may be a borehole that has been drilled in the earth to a depth sufficient to hold the conduit therein. The hole may be horizontal, subhorizontal, or directional drilled. As used herein, "conduit" refers to a material through which fluid or a current may flow, wherein the conduit may be hollow to allow the passage of fluid therethrough or solid to allow the flow of current therethrough. The conduit may be, for example, a heat transfer loop or a grounding rod.

The grout fluid generally includes an aqueous fluid and grout. The aqueous fluid utilized in the grout fluid can be water from any source provided that it does not adversely affect the components or properties of the grout fluid and that it would not contaminate nearby soil. The aqueous fluid generally includes fresh water, brackish water, seawater, brine, and any combination thereof. In one or more embodiments, the aqueous fluid is fresh water. In one or more embodiments, fresh water in an amount sufficient to form a pumpable fluid is mixed with the grout.

In one or more embodiments, the grout fluid includes a thermally conductive material. Such materials include those materials known to those of ordinary skill in the art to be thermally conductive. Suitable thermally conductive materials may include, but are not limited to, silicates such as sand, quartz silica, and combinations thereof, carbon-based materials such as graphite, carbon nanotubes, graphene, pitch coke, tar coke, amorphous carbon, vein carbon, powdered carbon, desulfurized petroleum coke, carbon steel, and combinations thereof, and metal particulates such as brass, a brass alloy, chrome nickel steel, stainless steel, a transition metal (e.g., copper, cadmium, cobalt, gold, silver, iridium, iron, molybdenum, nickel, platinum, and/or zinc), a transition metal alloy (e.g., alloys of copper, cadmium, cobalt, gold, silver, iridium, iron, molybdenum, nickel, platinum, and/or zinc), a post-transition metal (e.g., lead or tin), a post-transition metal alloy (e.g., alloys of lead and/or tin), an alkaline earth metal alloy (e.g., alloys of beryllium and/or magnesium), and combinations thereof. The grout fluid may include the thermally conductive material in an amount in a range of from about 1 weight percent to about 75 weight percent, or from about 5 weight percent to about 70 weight percent, or from about 10 weight percent to about 65 weight percent, based on the total weight of the grout fluid, for example.

The grout generally includes a clay material. The clay material may include bentonite. As used herein, "bentonite" refers to an absorbent aluminum phyllosilicate clay. In one or more embodiments, the bentonite includes montmorillonite. The bentonite may include elemental bentonite, e.g., potassium bentonite, sodium bentonite, calcium bentonite, aluminum bentonite or combinations thereof. As used herein, "elemental bentonite" refers to a bentonite having the named element, e.g., potassium etc. as the dominant (majority) element therein. In one or more embodiments, the bentonite includes sodium bentonite. In one or more embodiments, the only bentonite in the grout is sodium bentonite. The grout may include the bentonite in an amount in a range of from about 50 weight percent to about 90 weight percent, from about 55 weight percent to about 80 weight percent, or from about 60 weight percent to about 70 weight percent, based on the total weight of the grout, for example.

In one or more embodiments, the reduced concentration grout fluids include a high-yielding sodium bentonite. Sodium bentonite is a water-swellable clay in which the principal exchangeable cation is a sodium ion. Its use in the grout fluids of the present disclosure serves to enhance the viscosity of the grout fluids so that the solid particles contained in the grout fluids can be transported to a desired location. The sodium bentonite also contributes to the low hydraulic conductivity of the grout fluids, and thus enhances the ability of the fluids to form a good seal. Examples of suitable sodium bentonite clays include Wyoming sodium bentonite, Western sodium bentonite, and combinations thereof.

In one or more embodiments, a low quality or low yielding bentonite can also be used at lower concentrations, but enhanced with filtration control additives or viscosifiers such as low or high viscosity polyanionic cellulose, soda ash, guar gum, xanthan gum, magnesium oxide, and combinations thereof.

As used herein, a grade or type of a bentonite specifies the quality of the bentonite according to the number of barrels of 15 centipoise (cP) viscosity fluid that one ton of the bentonite would produce, termed "yield" and measured in barrels per ton (bbl/ton). A barrel is equivalent to $0.1589 \text{ m}^3$. The term "high yielding bentonite" refers to a bentonite having a yield greater than about 200 bbl/ton, and the term "low yielding bentonite" refers to a bentonite having a yield less than about 50 bbl/ton. The yield of any particular bentonite will be dependent on the type of bentonite being evaluated and, thus, these yield values are merely generally representative.

In one or more embodiments, the sodium bentonite can be powdered or granular, from sub −325 mesh to 8 mesh granular, from 230 mesh to 16 mesh, or from 200 mesh to 50 mesh.

The grout or grout fluid may include one or more additives. For example, the additives may be dry blended into the grout, or the additives may be added directly to the grout fluid. The additives may be selected from consistency modifiers, grout setting modifiers, and combinations thereof.

In one or more embodiments, the consistency modifiers include rheology modifiers, permeability reduction additives, and combinations thereof. In one or more embodiments, the consistency modifier can be any inert particulate material, such as powdered graphite, natural pozzolans, fly ash, diatomaceous earth, powdered silica materials (e.g. silica flour), talc, kaolin, illite, dolomite, mineral fillers (e.g., sand), rock, stone, perlite particles, vermiculite, water inert powders such as calcium carbonate and barium sulfate, sepiolite, zeolite, fuller's earth, calcium bentonite, and combinations thereof. In one or more embodiments, the consistency modifier is selected from rheology modifiers such as calcium carbonate, silica flour, powdered graphite, and combinations thereof. In one or more embodiments, the consistency modifier can be a permeability reduction additive such as polyanionic cellulose, carboxymethyl starch, modified lignins, and combinations thereof. In one or more embodiments, the consistency modifier includes calcium carbonate, silica flour, powdered graphite, and combinations thereof. The grout may include the consistency modifier in an amount in a range of from about 1 weight percent to about 50 weight percent, from about 20 weight percent to about 45 weight percent, or from about 30 weight percent to about 40 weight percent, based on the total weight of the grout, for example. The grout fluid may include the consistency modifier in an amount in a range of from about 0.5 weight percent to about 15 weight percent, from about 2 weight percent to about 10 weight percent, or from about 4 weight percent to about 7 weight percent, based on the total weight of the grout fluid, for example.

In one or more embodiments, the consistency modifier includes only calcium carbonate. Advantageously, in one or more embodiments, reduction in the amount of bentonite in the grout is possible because of the addition of calcium carbonate. Calcium carbonate replaces (or acts as a substitute) for at least some of the bentonite that is removed and acts as a rheology modifier by thinning the viscosity of the grout fluid. In contrast, calcium carbonate when added to cement makes the rheology component in the cement thicker, and also adds compressive strength to the cement. Calcium carbonate does not increase the compressive strength of the grout when added to a bentonite-based grout. Bentonite-based grouts cannot create compressive strengths, only shear strengths. Cement or cement grouts, on the other hand, can create compressive strengths. In general, higher amounts of calcium carbonate are added to a grout compared to a cement. The uses of calcium carbonate in a grout are thus significantly different from those in a cement.

The grout-setting modifier, among other things, may control the rheology of the grout and stabilize the grout over a broad density range. In one or more embodiments, grout-setting modifiers include inhibitors, dispersants, and combinations thereof. Inhibitors allow the grout fluid to remain workable until full hydration of the bentonite occurs. In one or more embodiments, suitable inhibitors include a salt comprising a cation and an anion, a polymer, a silicate (e.g., potassium silicate), a partially hydrolyzed polyvinyl acetate, a polyacrylamide, a partially hydrolyzed polyacrylamide, a polyalkylene glycol (e.g., polybutylene glycol, polyethylene glycol, and/or polypropylene glycol), a polyalkylene alcohol, a polyalkylene alkoxylate, a polyalkylene oligomer, a polyalkylene polymer, a polyalkylene copolymer, a cationic oligomer or polymer, an acid, a potassium salt (e.g., potassium fluoride, potassium chloride, potassium chlorate, potassium bromide, potassium iodide, potassium iodate, potassium acetate, potassium citrate, potassium formate, potassium nitrate, tribasic potassium phosphate, potassium phosphate dibasic, potassium phosphate monobasic, potassium sulfate, potassium bisulfate, potassium carbonate, potassium dichromate, and/or potassium ferrate), an ammonium salt (e.g., ammonium sulfate), a sodium salt (e.g., sodium chloride), an iron salt, an aluminum salt, a phosphonium salt, polyaminopolyamide-epichlorohydrin resin, diallydimethylammonium chloride, polydiallyldimethylammonium chloride, aminoethylethanolamine, diethylenetriamine, triethylenetetramine, diethanolamine, triethanolamine, polyvinyl pyrrolidone, and any combination thereof. In one or more embodiments, the inhibitors include ammonium sulfate, potassium chloride, sodium chloride, partially hydrolyzed polyacrylamide, and combinations thereof.

Dispersants break up or scatter particles of bentonite, which allows the grout fluid to remain workable until hydration and set. In one or more embodiments, suitable dispersants include ammonium lignosulfonate salt, metal lignosulfonate salts, phosphates, polyphosphates, organophosphates, phosphonates, tannins, leonardite, polyacrylates having a molecular weight less than about 10,000, and combinations thereof. In one or more embodiments, the dispersant includes sodium acid pyrophosphate (SAPP), AQUA-CLEAR® PFD DRY dispersant (commercially available from Halliburton Energy Services, Inc.), and combinations thereof.

In one or more embodiments, suitable grout-setting modifiers include ammonium sulfate, potassium chloride, sodium chloride, SAPP, partially hydrolyzed polyacrylamide, and combinations thereof. The grout may include the grout-setting modifier in an amount in a range of from about 0.1 weight percent to about 5 weight percent, from about 0.3 weight percent to about 4 weight percent, or from about 0.5 weight percent to about 2 weight percent, based on the total weight of the grout, for example. The grout fluid may include the grout-setting modifier in an amount in a range of from about 0.01 weight percent to about 5 weight percent, from about 0.05 weight percent to about 3 weight percent, or from about 0.1 weight percent to about 1 weight percent, based on the total weight of the grout fluid, for example.

In one or more embodiments, the bentonite-based grout consists essentially of calcium carbonate, bentonite, and one or more grout-setting modifiers. In one or more embodiments, the bentonite-based grout consists essentially of calcium carbonate, sodium bentonite, potassium chloride, and ammonium sulfate. In one or more embodiments, the bentonite-based grout consists essentially of calcium carbonate, sodium bentonite, and ammonium sulfate. As used herein, a bentonite-based grout consisting essentially of the recited components contains substantially only those components, and does not contain any cementitious materials or any thermally insulative materials. For example, a bentonite-based grout consisting essentially of calcium carbonate, sodium bentonite, potassium chloride, and ammonium sulfate does not include substantial amounts of other components, but may contain insubstantial amounts of impurities ordinarily associated with calcium carbonate, sodium bentonite, potassium chloride, and ammonium sulfate, and may also contain insubstantial or substantial amounts of materials that do not materially affect the basic and novel characteristics of the bentonite-based grout for use in a grout fluid that has a hydraulic conductivity less than about $1 \times 10^{-7}$ cm/s (e.g., in between $1 \times 10^{-7}$ cm/s and $1 \times 10^{-9}$ cm/s). In some embodiments, these insubstantial amounts are less than about 0.01%. In other embodiments, they are less than about 1%. Materials that do not materially affect the basic and novel characteristics of the bentonite-based grout include thermally conductive materials, such as sand, quartz, or graphite.

In one or more embodiments, the bentonite-based grout consists essentially of calcium carbonate, bentonite, one or more grout-setting modifiers, and one or more thermally conductive materials. In one or more embodiments, the bentonite-based grout consists essentially of calcium carbonate, sodium bentonite, potassium chloride, ammonium sulfate, and one or more thermally conductive materials. In one or more embodiments, the bentonite-based grout consists essentially of calcium carbonate, sodium bentonite, ammonium sulfate, and one or more thermally conductive materials.

In one or more embodiments, a grout fluid prepared from a bentonite-based grout consists essentially of water and a bentonite-based grout consisting essentially of calcium carbonate, bentonite, and one or more grout-setting modifiers. In one or more embodiments, the grout fluid consists essentially of water and a bentonite-based grout consisting essentially of calcium carbonate, sodium bentonite, potassium chloride, and ammonium sulfate. In one or more embodiments, the grout fluid consists essentially of water and a bentonite-based grout consisting essentially of calcium carbonate, sodium bentonite, and ammonium sulfate. As used herein, a grout fluid consisting essentially of the recited components contains substantially only those components, and does not contain any cementitious materials or any thermally insulative materials. For example, a grout fluid consisting essentially of water and a bentonite-based grout consisting essentially of calcium carbonate, sodium bentonite, potassium chloride, and ammonium sulfate does not include substantial amounts of other components, but may contain insubstantial amounts of impurities ordinarily associated with water, calcium carbonate, sodium bentonite, potassium chloride, and ammonium sulfate, and may also contain insubstantial or substantial amounts of materials that do not materially affect the basic and novel characteristics of the grout fluid that has a hydraulic conductivity less than about $1\times10^{-7}$ cm/s (e.g., in between $1\times10^{-7}$ cm/s and $1\times10^{-9}$ cm/s). In some embodiments, these insubstantial amounts are less than about 0.01%. In other embodiments, they are less than about 1%. Materials that do not materially affect the basic and novel characteristics of the grout fluid include thermally conductive materials, such as sand, quartz, or graphite.

In one or more embodiments, the grout fluid consists essentially of water and a bentonite-based grout consisting essentially of calcium carbonate, bentonite, one or more grout-setting modifiers, and one or more thermally conductive materials. In one or more embodiments, the grout fluid consists essentially of water and a bentonite-based grout consisting essentially of calcium carbonate, sodium bentonite, potassium chloride, ammonium sulfate, and one or more thermally conductive materials. In one or more embodiments, the grout fluid consists essentially of water and a bentonite-based grout consisting essentially of calcium carbonate, sodium bentonite, ammonium sulfate, and one or more thermally conductive materials.

In one or more embodiments, the bentonite-based grout consists of calcium carbonate, bentonite, and one or more grout-setting modifiers. In one or more embodiments, the bentonite-based grout consists of calcium carbonate, bentonite, one or more grout-setting modifiers, and one or more thermally conductive materials. In one or more embodiments, the bentonite-based grout consists of calcium carbonate, sodium bentonite, potassium chloride, and ammonium sulfate. In one or more embodiments, the bentonite-based grout consists of calcium carbonate, sodium bentonite, and ammonium sulfate.

In one or more embodiments, the bentonite-based grout consists of calcium carbonate, bentonite, one or more grout-setting modifiers, and one or more thermally conductive materials. In one or more embodiments, the bentonite-based grout consists of calcium carbonate, bentonite, one or more grout-setting modifiers, and one or more thermally conductive materials. In one or more embodiments, the bentonite-based grout consists of calcium carbonate, sodium bentonite, potassium chloride, ammonium sulfate, and one or more thermally conductive materials. In one or more embodiments, the bentonite-based grout consists of calcium carbonate, sodium bentonite, ammonium sulfate, and one or more thermally conductive materials.

In one or more embodiments, a grout fluid prepared from a bentonite-based grout consists of water and a bentonite-based grout consisting of calcium carbonate, bentonite, and one or more grout-setting modifiers. In one or more embodiments, the grout fluid consists of water and a bentonite-based grout consisting of calcium carbonate, bentonite, one or more grout-setting modifiers, and one or more thermally conductive materials. In one or more embodiments, the grout fluid consists of water and a bentonite-based grout consisting of calcium carbonate, sodium bentonite, potassium chloride, and ammonium sulfate. In one more embodiments, the grout fluid consists of water and a bentonite-based grout consisting of calcium carbonate, sodium bentonite, and ammonium sulfate.

In one or more embodiments, the grout fluid consists of water and a bentonite-based grout consisting of calcium carbonate, bentonite, one or more grout-setting modifiers, and one or more thermally conductive materials. In one or more embodiments, the grout fluid consists of water and a bentonite-based grout consisting of calcium carbonate, sodium bentonite, potassium chloride, ammonium sulfate, and one more thermally conductive materials. In one or more embodiments, the grout fluid consists of water and a bentonite-based grout consisting of calcium carbonate, sodium bentonite, ammonium sulfate, and one or more thermally conductive materials.

In one or more embodiments, the grout and/or grout fluid may include further additives as deemed appropriate by one of ordinary skill in the art. Suitable additives would bring about desired results without adversely affecting other components in the grout or grout fluid, or the properties thereof.

The grout fluid is generally formed via methods known in the art. For example, the grout fluid may be formed by contacting or mixing the grout, the aqueous solution, and the one or more additives. The grout may be made by combining all of the components (e.g., bentonite and additives) in any order and thoroughly mixing or blending the components in a manner known to one of ordinary skill in the art. An aqueous solution and the grout may then be mixed to form the grout fluid using a standard mixing device such as a grouter or other similarly functioning device.

In one or more embodiments, the grout fluids of the present disclosure are formed by combining the grout that is a "one-sack product" with water. As used herein, "one-sack product" refers to a form of the grout in which its components are combined together in a single container such as a sack, allowing the grout to be easily transported to an on-site location where it will be used to form a grout fluid.

In one or more embodiments, the grout fluid further includes a thermally conductive material. In one or more embodiments, after the grout fluid is formed, the grout fluid is introduced into the space between a conduit and the sidewalls of a hole so that the grout fluid is in contact with the conduit and the sidewalls. In one or more embodiments, the grout fluid is introduced into the space until the space is filled with the grout fluid. As used herein, "introducing" includes pumping, injecting, pouring, releasing, displacing, spotting, circulating, or otherwise placing a fluid or material within a hole, well, wellbore, borehole, or subterranean formation using any suitable manner known in the art. The hole in the earth may be a borehole that has been drilled in the earth to a depth sufficient to hold the conduit therein. After the placement of the grout fluid in the hole, the grout fluid is allowed to set, thus forming a thermally conductive seal between the conduit and the earth.

The present disclosure advantageously reduces the amount of bentonite-based grout in a grout fluid without sacrificing the slurry volume yield, permeability, set or pumpability. In one or more embodiments, the grout fluid includes about 25 pounds of bentonite-based grout in about 14 gallons of water (or about 1.8 pounds of grout per gallon of water) to about 25 pounds of bentonite-based grout in about 22 gallons of water (or about 1.1 pounds of grout per gallon of water) to achieve a slurry yield that is similar to the 50 pound grout system with the same water requirement.

That is, the volume of slurry that is produced when 25 pounds of bentonite-based grout is mixed with about 14-22 gallons of water is similar to the volume of slurry that is produced when 50 pounds of grout is mixed with the same amount of water. For example, a 25 pound sack of bentonite-based grout mixed with about 14 gallons of water provides a slurry volume yield of 15.15 gallons, while a 50 pound sack of grout mixed with about 14 gallons of water provides a slurry volume yield of 16.35 gallons.

In one or more embodiments, the grout fluids of the present disclosure meet or exceed the geothermal industry standard permeability requirement of $1\times10^{-7}$ cm/s when tested using ASTM procedure D5084. In one or more embodiments, the set grout fluid has a hydraulic conductivity of less than about $1\times10^{-7}$ cm/s, less than about $9\times10^{-8}$ cm/s, or less than about $7\times10^{-8}$ cm/s. In an exemplary embodiment, the set grout fluid has a hydraulic conductivity of less than $1\times10^{-9}$ cm/s (e.g., between $1\times10^{-7}$ cm/s and $1\times10^{-10}$ cm/s).

In one or more embodiments, the grout fluids of the present disclosure are capable of setting to a thick consistency so as to suspend thermally conductive materials in geothermal applications. For example, 25 pounds of bentonite-based grout can suspend up to 400 pounds of geothermal sand. In one or more embodiments, although the grout fluids set in less than 24 hours, they remain workable, mixable, and pumpable until placement, and have a suitable gel strength that allows for acceptable working times with the grout. In one or more embodiments, after the grout fluid remains static for 10 minutes, the grout fluid has a gel strength of greater than about 50 lb/100 ft$^2$, greater than about 55 lb/100 ft$^2$, or greater than about 60 lb/100 ft$^2$ as measured by a FANN 35A rotational viscometer at 3 RPM.

As used herein, "setting" is defined as the process, due to chemical reactions, occurring after the addition of mixing water, that results in a gradual development of rigidity of a grout. As used herein, a grout is "set" when it attains a consistency between pudding and peanut butter. For example, once a grout is set, it typically will not pour without some agitation. In one or more embodiments, the grout fluids of the present disclosure set within 24 hours after the addition of mixing water.

During grouting operations, it is necessary for the grout fluid to remain pumpable during introduction into a borehole and until the fluid is situated in the borehole. After the grout fluid has reached the portion of the borehole to be grouted, the grout fluid ultimately sets. A grout fluid that thickens too quickly while being pumped can damage pumping equipment or block tubulars, and a grout fluid that sets too slowly can cost time and money while waiting for the grout to set.

In one or more embodiments, the grout fluids of the present disclosure have a good working time, i.e., the time period between when they are prepared and when their viscosity is insufficient to allow it to be displaced into a space. For example, the working times of the grout fluids of the present disclosure may range from about 15 minutes to about 1 hour. In one or more embodiments, the grout fluids have a viscosity of less than about 100 cP, less than about 90 cP, or less than about 85 cP as measured by a FANN 35A rotational viscometer at 300 RPM within 5 minutes of the grout fluid being prepared.

In one or more embodiments, the effectiveness of the grout fluids is not decreased, even while using lower concentrations of bentonite-based grout. Thus, a normal 50 pound sack of bentonite-based grout can be mixed with a larger amount of water to increase the slurry volume yield.

In one or more embodiments, the grouts avoid subsidence. Subsidence is an undesirable phenomenon where the grout shrinks or sinks, and may release water. This has the potential to cause, at a minimum, an inefficiently installed system, and at most a complete hole failure after installation. In one or more embodiments, after 30 days and 60 days, no reduction in height or shrinkage in diameter was observed in the grouts. This indicates that the grouts when placed properly, will avoid subsidence.

Geothermal Applications

The required grout characteristics vary by industry. For example, grouts used in geothermal heat loop installations should have high thermal conductivity characteristics along with the requisite sealing abilities, and inclusion of cementitious materials in the grout is discouraged because the inherent calcium in cement or cementitious materials is a known contaminant to bentonite. This contaminant will ultimately degrade the swelling capabilities of the bentonite and cause the sealing abilities of the grout to fail.

Heat transfer loops are often placed in the earth to provide for the heating and cooling of residential and commercial spaces. Since ground temperatures are generally similar to room temperatures in buildings, the use of such heat transfer loops can be cost effective alternatives to conventional heating and cooling systems. The installation of such heat transfer loops involves inserting a continuous loop of pipe connected to a heat pump unit into a hole or series of holes in the earth to act as a heat exchanger. A thermally conductive grout is then placed in the hole between the pipe wall and the earth. A heat transfer fluid can be circulated through the underground heat transfer loop to allow heat to be transferred between the earth and the fluid via conduction through the grout and the pipe wall. When the system is operating in a heating mode, a relatively cool heat transfer fluid is circulated through the heat transfer loop to allow heat to be transferred from the warmer earth into the fluid. Similarly, when the system is operating in a cooling mode, a relatively warm heat transfer fluid is circulated through the heat transfer loop to allow heat to be transferred from the fluid to the cooler earth. Thus, the earth can serve as both a heat supplier and a heat sink. The efficiency of the heat transfer loop is affected by the grout employed to provide a heat exchange pathway and a seal from the surface of the earth down through the hole. The grout needs to have a sufficient thermal conductivity to ensure that heat is readily transferred between the heat transfer fluid and the earth. Further, the grout must form a seal that is substantially impermeable to fluids that could leak into and contaminate ground water penetrated by the hole in which it resides. The hydraulic conductivity, which measures the rate of movement of fluid (i.e., distance/time) through the grout, is thus desirably low. Moreover, the grout needs to have a sufficient viscosity to allow for its placement in the space between the heat transfer loop and the earth without leaving voids that could reduce the heat transfer through the grout.

Referring now to FIG. 1, illustrated is a schematic of a system that can deliver the grout fluids of the present disclosure to a downhole location for grouting a geothermal well loop, according to one or more embodiments. As depicted in FIG. 1, system 1 may include mixing tank 10, in which the grout fluids may be formulated. The grout fluids may be conveyed via line 12 to pump 20, and finally to tremie line 16 extending into a wellbore 22 in a subterranean formation 18. As used herein, the term "tremie" refers to a tubular, such as a pipe, through which a grout fluid is placed into a wellbore. The term "tremie" as used herein is not limited to grout fluid placement at a particular water level and use of a tremie to place grout fluid may be performed below or above water level, without departing from the scope of the present disclosure.

A dual piston pump may be used to pump the grout fluid into wellbore 22 through tremie line 16. Alternatively, a piston pump may be used because of its ability to pump materials with a high solids content at higher pressures.

The tremie line 16 extends into an annulus 14 formed between the subterranean formation 18 and a geothermal well loop 24. The geothermal well loop 24 may be a loop with a u-shaped bottom, an S-configuration, an infinity-shaped configuration, or any other configuration capable of forming a continuous tubular for circulating fluid therein to provide cooling and/or heating. The geothermal well loop 24 may be connected to a circulating pump and/or heating and cooling equipment at the surface above the subterranean formation 18.

In use, in one or more embodiments, a grout fluid exits the bottom of the tremie line 16 and the tremie line 16 remains submerged several feet (between about one and three feet) below the level of the grout fluid. As the level of the grout fluid rises in the annulus 14, the tremie line 16 may be withdrawn at approximately the same rate as the final grout fluid is being pumped into the annulus 14 with the pump 20.

While FIG. 1 depicts introducing the grout fluid into an annulus to grout a geothermal well loop in a subterranean formation, other methods may also be employed without departing from the scope of the present disclosure. For example, a displacement method may be utilized where the grout fluid is first introduced into a subterranean formation followed by setting the geothermal well loop therein, which displaces the grout fluid. In other embodiments, an inner-string method of placing the grout fluid may be used where a cementing float shoe is attached to the bottom of a pipe for forming the geothermal well loop before it is sealed and a tremie line is lowered until it engages the shoe, injecting the final grout fluid into the annulus with the tremie line within the pipe. In other embodiments, a casing method of grouting may be utilized where the grout fluid is placed in a pipe for forming the geothermal well loop before it is sealed and the grout fluid is then forced out of the bottom of the pipe and into the annulus. Other methods may also be employed, without departing from the scope of the present disclosure.

In one or more embodiments, methods of installing a conduit in a hole in the earth are provided. In one or more embodiments, the methods include placing the conduit in the hole in the earth, mixing a grout, which may be a one-sack product, with water to form a grout fluid, and placing the grout fluid in the hole adjacent to the conduit. The hole in the earth may be a borehole that has been drilled in the earth to a depth sufficient to hold the conduit therein.

In one or more embodiments, the conduit is a grounding rod used to protect structures such as television towers and radio antennas from lightning strikes. The grounding rod may extend from the top of such structure down to the set grout fluid, which has a relatively low resistivity. As such, if lightning strikes the grounding rod, the current created by the lightning may pass through the grounding rod and the set grout fluid to the ground.

Figure 2:
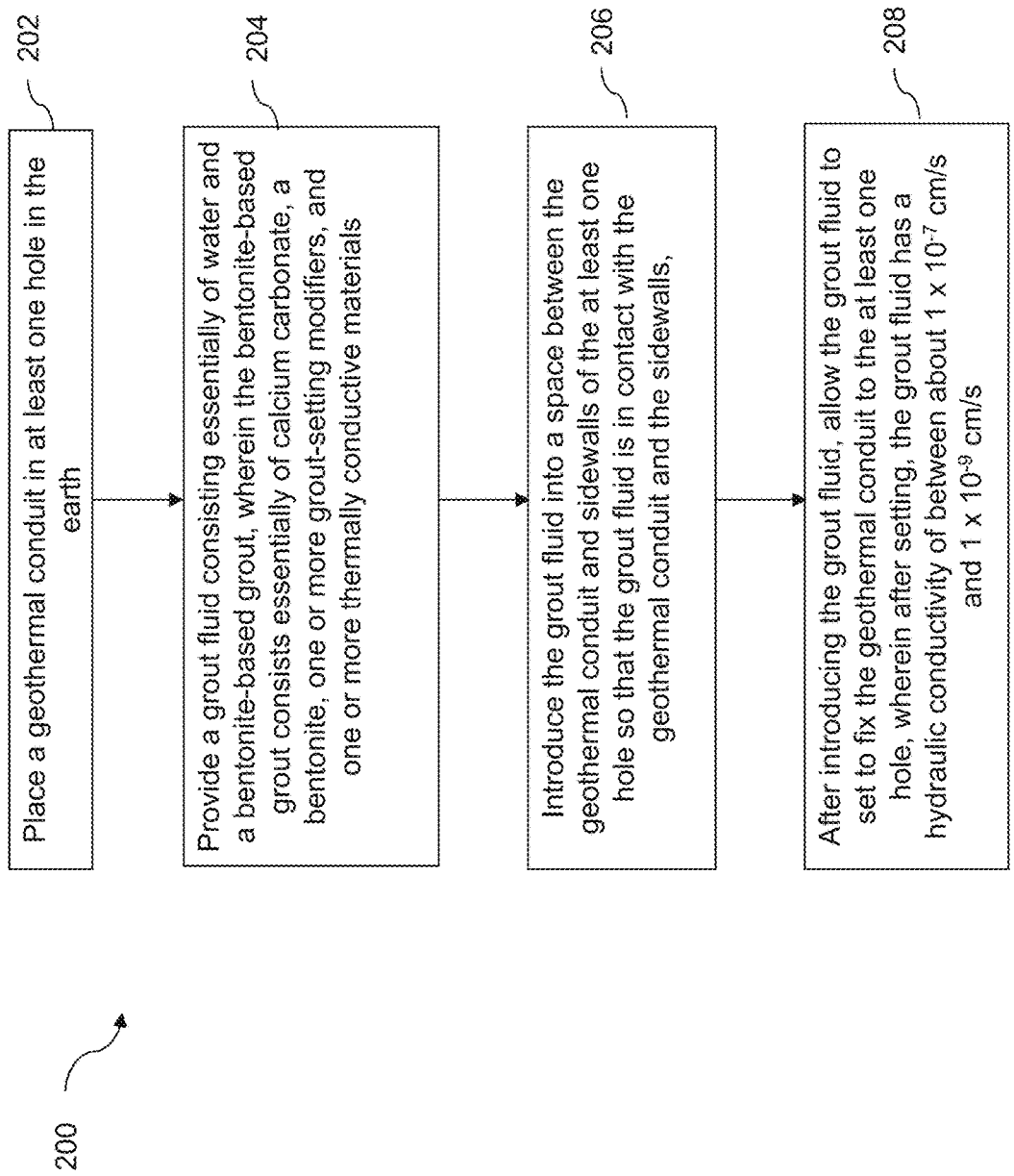
FIG. 2 depicts a method of using a grout fluid according to one or more embodiments.

A method of using a grout fluid is generally provided. Turning now to FIG. 2, the method 200 includes placing a geothermal conduit in at least one hole in the earth in step 202, providing a grout fluid consisting essentially of water and a bentonite-based grout, wherein the bentonite-based grout consists essentially of calcium carbonate, a bentonite, one more grout-setting modifiers, and one or more thermally conductive materials in step 204, introducing the grout fluid into a space between the geothermal conduit and sidewalls of the at least one hole so that the grout fluid is in contact with the geothermal conduit and the sidewalls in step 206, and after introducing the grout fluid, allowing the grout fluid to set to fix the geothermal conduit to the at least one hole, wherein after setting, the grout fluid has a hydraulic conductivity of between about $1 \times 10^{-7}$ cm/s and $1 \times 10^{-9}$ cm/s in step 208.

In one or more embodiments, the set grout fluids seal the conduit within the hole in the earth and act as a heat transfer medium between the conduit and the earth. In one or more embodiments, the conduit is a heat transfer loop through which a heat transfer fluid flows. Heat may be transferred between the earth and the heat transfer fluid via the set grout fluid and the walls of the heat transfer loop for the purpose of heating and/or cooling a space such as a building located above the surface of the earth.

In one or more embodiments, after the grout fluid has set, it exhibits excellent properties that allow it to be used in the manner described above. Advantageously, the grout fluid can be prepared inexpensively since the amount of the grout needed compared to the amount of water is relatively low. Further, less labor is required to prepare the grout fluid such that several holes in the earth can be filled more quickly.

Annular Sealant and Well Abandonment Applications

For abandoning a well or mine, or for sealing annular spaces, the grout need not have thermal conductivity characteristics. A suitable grouting material for these applications should still, however, be able to provide a good seal having both low hydraulic conductivity and high structural stability under most geological conditions. Bentonite-based grouts are known to exhibit low permeability and high swelling capability as compared to cement-based grouting materials.

In addition to grouting geothermal well loops, the grout fluids of the present disclosure are useful for sealing the annular space around a well casing and plugging abandoned wells in practically all types of formations. As used herein, a "well" includes at least one wellbore drilled into a subterranean formation, which may be a reservoir or an aquifer, or adjacent to a reservoir or aquifer. Oil and gas hydrocarbons, as well as water, are naturally occurring in some subterranean formations. A subterranean formation containing oil or gas is sometimes referred to as a reservoir. A subterranean formation that contains water is referred to as an aquifer.

In order to produce hydrocarbons or water, a wellbore is drilled into or near a reservoir or aquifer. The wellbore may be an open-hole or cased-hole. In an open-hole wellbore, a tubular called a tubing string is placed into the wellbore. The tubing string allows fluids to be introduced into or flowed from a remote portion of the wellbore. In a cased-hole, another tubular called a casing is placed into the wellbore that can contain a tubing string. As used herein, the word "tubular" means any kind of pipe. Examples of tubulars include, but are not limited to, a tubing string, a casing, a drill pipe, a line pipe, and a transportation pipe/tubular. Tubulars can also be used to transport fluids into or out of a subterranean formation, such as oil, gas, water, liquefied methane, coolants, and heated fluids. For example, a tubular can be placed underground to transport produced hydrocarbons or water from a subterranean formation to another location.

As used herein, the term "annulus" means the space between two generally cylindrical objects, one inside the other, where fluid can flow. The objects can be concentric or eccentric. One of the objects can be a tubular and the other object can be an enclosed conduit. The enclosed conduit can be a wellbore or borehole or it can be another tubular.

Referring to an oil, gas, or water well, in an open-hole well, the space between the wellbore and the outside of a tubing string is an annulus. In a cased-hole, the space between the wellbore and the outside of the casing is an annulus. Also, in a cased-hole, there may be an annulus between the tubing string and the inside of the casing. Referring to transportation pipelines, an annulus can exist between the outside of the tubular and the borehole underground in which the tubular is placed. In an offshore environment, a transportation tubular can be located inside another tubular. The space between the outside of the transportation tubular and the inside of the other tubular is an annulus.

In one or more embodiments, the methods of the present disclosure introduce a grout fluid into an annulus. For example, in a cased-hole, the grout fluids of the present disclosure can be placed and allowed to set in the annulus between the wellbore and the casing in order to create a seal in the annulus. By sealing the casing in the wellbore, fluids are prevented from flowing into the annulus. Consequently, hydrocarbons or water can be produced in a controlled manner by directing the flow of hydrocarbons or water through the casing and into the wellhead. By way of another example, a grout fluid of the present disclosure can be placed in the annulus between a casing and a tubing string. Grout fluids of the present disclosure can also be used as an isolating fluid to isolate one portion of an annulus from another portion of the annulus.

Other than oil and gas wells, there are numerous instances where it is necessary to effect sealing in certain areas in drilled earth boreholes. Such boreholes occur, for example, in water well drilling, in observation holes for construction and engineering purposes such as hydrology studies, in mineral exploration boreholes and in seismic shot holes. For example, it is common practice in the case of water wells to grout or seal well casing by filling the annulus between the casing and the wall of the borehole. Additionally, it is often necessary when an earth borehole is abandoned to plug it to prevent the commingling of aquifer water and/or to prevent entry of contaminants from the surface.

In one or more embodiments, the grout fluids of the present disclosure form a seal to prevent contamination of the subsurface from the surface, as well as prevent groundwater contamination. The main purposes of grouting and sealing a well are to (1) restore the earth formation outside the casing to its original condition, (2) prevent seepage of polluted surface water downwardly along the exterior of the casing into the well, (3) stabilize and secure the well casing, and (4) preserve the hydraulic characteristics of artesian formations and prevent leakage upwardly along the exterior of the casing. Advantageously, the grout fluids of the present disclosure may be used to seal wells in a variety of situations.

Figure 3:
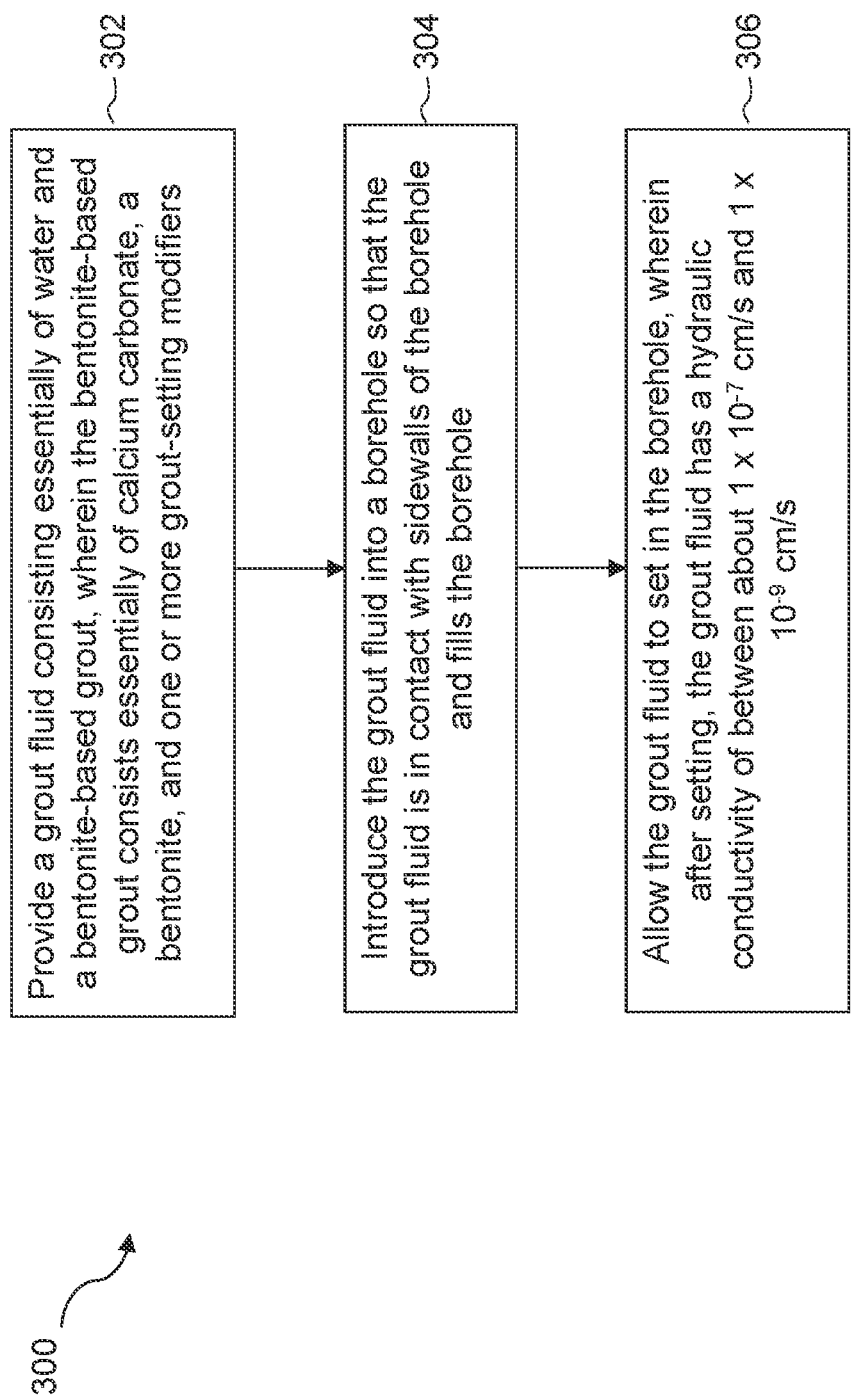
FIG. 3 depicts a method of using a grout fluid according to one or more embodiments.

A method of using a grout fluid is generally provided. Turning now to FIG. 3, the method 300 includes providing a grout fluid consisting essentially of water and a bentonite-based grout, wherein the bentonite-based grout consists essentially of calcium carbonate, a bentonite, and one or more grout-setting modifiers in step 302, introducing the grout fluid into a borehole so that the grout fluid is in contact with sidewalls of the borehole and fills the borehole in step 304, and allowing the grout fluid to set in the borehole, wherein after setting, the grout fluid has a hydraulic conductivity between about $1\times10^{-7}$ cm/s and $1\times10^{-9}$ cm/s in step 306.

Thus, a method of using a grout fluid is described herein. Embodiments of the method may generally include placing a geothermal conduit in at least one hole in the earth; providing a grout fluid including a bentonite-based grout and water, wherein the bentonite-based grout is present in the grout fluid in a concentration in a range of about 15 pounds of bentonite-based grout per about 27 gallons of water to about 25 pounds of bentonite-based grout per about 11.5 gallons of water; introducing the grout fluid into a space between the geothermal conduit and sidewalls of the at least one hole so that the grout fluid is in contact with the geothermal conduit and the sidewalls; and after introducing the grout fluid, allowing the grout fluid to set to fix the geothermal conduit to the at least one hole, wherein after setting, the grout fluid has a hydraulic conductivity of less than about $1\times10^{-7}$ cm/s as measured by ASTM procedure D5084. For any of the foregoing embodiments, the method may include any one of the following, alone or in combination with each other.

In one or more embodiments, the concentration of the grout in the grout fluid is in a range of about 25 pounds of the bentonite-based grout per about 14 gallons of water to about 25 pounds of the bentonite-based grout per about 20 gallons of water.

In one or more embodiments, the bentonite-based grout or the grout fluid includes one or more consistency modifiers. In one or more embodiments, the one or more consistency modifiers are selected from rheology modifiers, permeability reduction additives, and combinations thereof.

In one or more embodiments, the bentonite-based grout or the grout fluid further includes one or more grout-setting modifiers. In one or more embodiments, the one or more grout-setting modifiers is selected from inhibitors, dispersants, and combinations thereof.

In one or more embodiments, the grout fluid further includes one or more thermally conductive materials. In one or more embodiments, the one or more thermally conductive materials is selected from silicates, carbon-based materials, metal particulates, and combinations thereof.

In one or more embodiments, the grout fluid exhibits desirable properties for an industry standard grout. In one or more embodiments, the grout fluid has a viscosity of less than about 100 cp as measured by a FANN 35A rotational viscometer at 300 RPM within 5 minutes of the grout fluid being prepared. In one or more embodiments, when the grout fluid remains static for 10 minutes, the grout fluid has a gel strength of greater than about 50 lb/100 ft$^2$ as measured by a FANN 35A rotational viscometer at 3 RPM. In one or more embodiments, the grout fluid sets within 24 hours after the grout fluid is introduced into the at least one hole.

Another method of using a grout fluid is described herein. Embodiments of the method generally include providing a grout fluid including a bentonite-based grout and water, wherein the bentonite-based grout is present in the grout fluid in a concentration in a range of about 15 pounds of bentonite-based grout per about 27 gallons of water to about 25 pounds of bentonite-based grout per about 11.5 gallons of water; introducing the grout fluid into a borehole in the earth so that the grout fluid is in contact with sidewalls of the borehole and fills the borehole; and allowing the grout fluid to set in the borehole, wherein after setting, the grout fluid has a hydraulic conductivity of less than about $1\times10^{-7}$ cm/s as measured by ASTM procedure D5084. For any of the foregoing embodiments, the method may include any one of the following, alone or in combination with each other.

In one or more embodiments, introducing the grout fluid into the borehole includes introducing the grout fluid into an annulus between the borehole and a casing.

In one or more embodiments, the concentration is in a range of about 25 pounds of the bentonite-based grout per about 14 gallons of water to about 25 pounds of the bentonite-based grout per about 20 gallons of water.

In one or more embodiments, the bentonite-based grout or the grout fluid further includes a consistency modifier and a grout-setting modifier.

In one or more embodiments, the grout fluid has a viscosity of less than about 100 cp as measured by a FANN 35A rotational viscometer at 300 RPM within 5 minutes of the grout fluid being prepared. In one or more embodiments, after the grout fluid remains static for 10 minutes, the grout fluid has a gel strength of greater than about 50 lb/100 ft$^2$ as measured by a FANN 35A rotational viscometer at 3 RPM. In one or more embodiments, the grout fluid sets within 24 hours after the grout fluid is introduced into the at least one hole.

In one or more embodiments, while different steps, processes, and procedures are described as appearing as distinct acts, one or more of the steps, one or more of the processes, and/or one or more of the procedures may also be performed in different orders, simultaneously and/or sequentially. In one or more embodiments, the steps, processes and/or procedures may be merged into one or more steps, processes and/or procedures. In one or more embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

In addition to methods of using a grout fluid, a grout fluid is described herein. Embodiments of the grout fluid generally include an aqueous fluid and a grout. The grout generally includes sodium bentonite present in an amount of about 50 percent to about 90 percent by weight of the grout, a consistency modifier present in an amount of about 1 percent to 50 percent by weight of the grout, and a grout-setting modifier present in an amount of about 0.1 to 5 percent by weight of the grout. In one or more embodiments, the grout fluid further includes a thermally conductive material.

The following examples are illustrative of the compositions, fluids, and methods discussed above and are not intended to be limiting.

Example 1

Permeability Tests

Nine (9) grout fluids were tested using, a high yielding sodium bentonite, a high purity sodium bentonite, or a granular bentonite product as the bentonite base. Calcium carbonate was used as the consistency modifier. Potassium chloride and/or ammonium sulfate were used as the grout-setting modifier to either disperse or inhibit the bentonite so as to make the grout fluid pumpable until time for the grout fluid to set.

Hydraulic conductivity was tested using an American Petroleum Institute (API) filter press. Each grout fluid was poured over an API filter press cell and allowed to set for 24 hours. Distilled water was then poured onto the filter press cell, the filter press lid was attached, and 10 pounds per square inch (psi) of compressed air was applied. The total filtrate was collected and used to calculate hydraulic conductivity.

TABLE 1

Grout Fluids Tested and Associated Permeability

| Fluid | Water, (mL) | High yielding bentonite (g) | High purity bentonite (g) | Granular bentonite (g) | Calcium Carbonate (g) | Potassium Chloride (g) | Ammonium Sulfate (g) | Hydraulic Conductivity, (cm/s) |
|---|---|---|---|---|---|---|---|---|
| 1 | 350 | 41.18 | | | 25.39 | 2.06 | | $8.26 \times 10^{-8}$ |
| 2 | 350 | 44.61 | | | 21.96 | 2.06 | | $9.51 \times 10^{-8}$ |
| 3 | 350 | 48.04 | | | 18.5 | 2.06 | | $9.51 \times 10^{-8}$ |
| 4 | 350 | 45.29 | | | 22.65 | | 0.69 | $6.79 \times 10^{-8}$ |
| 5 | 350 | 44.61 | | | 22.65 | | 1.37 | $8.46 \times 10^{-8}$ |
| 6 | 350 | | 44.61 | | 22.65 | | 1.37 | $9.51 \times 10^{-8}$ |
| 7 | 350 | | 44.61 | | 23.33 | | 0.69 | $9.34 \times 10^{-8}$ |
| 8 | 350 | 54.18 | | | 3.01 | 1.81 | 1.20 | $3.20 \times 10^{-8}$ |
| 9 | 350 | | | 68.63 | | | | $3.75 \times 10^{-8}$ |

Figure 4:
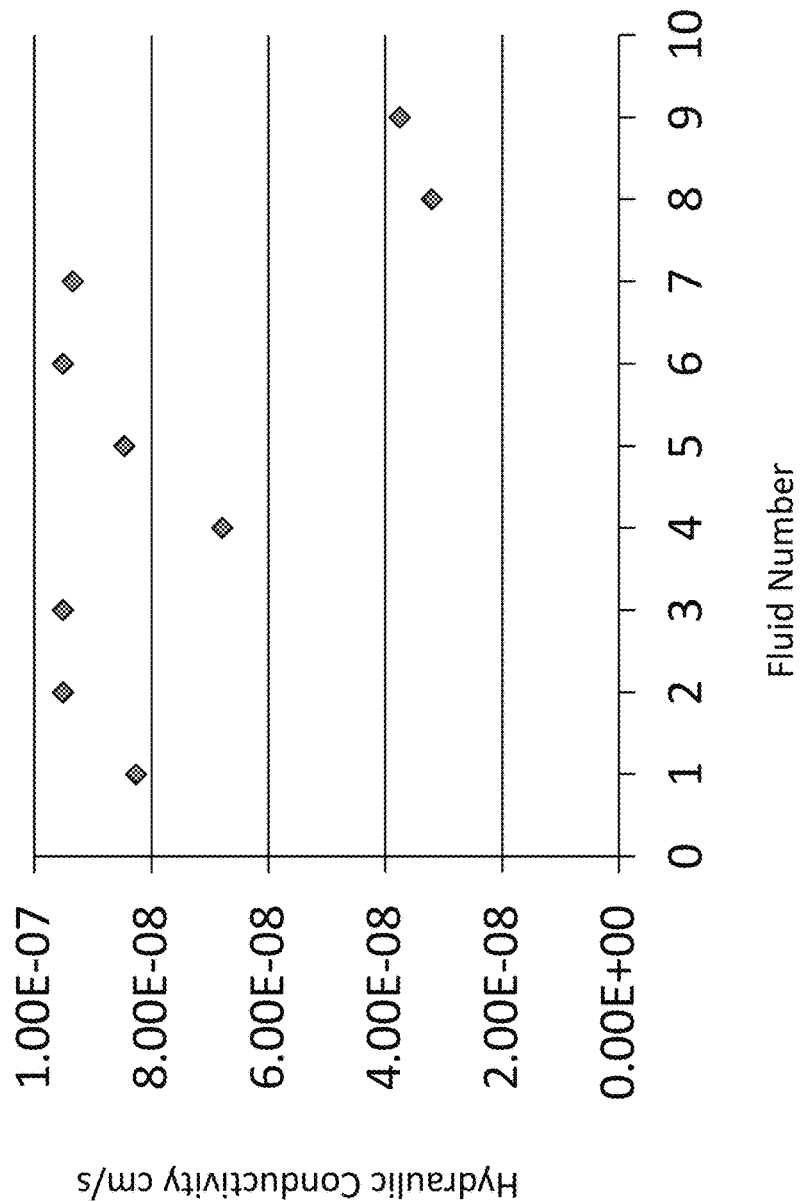
FIG. 4 illustrates the results of permeability testing on grout fluids according to one or more embodiments.

FIG. 4 illustrates that grout fluids 1-9 have hydraulic conductivity below the maximum allowable permeability of $1 \times 10^{-7}$ cm/s. Thus, grout fluids 1-9 exceed the geothermal industry standard permeability requirement of $1 \times 10^{-7}$ cm/s, even with a reduced concentration of bentonite-based grout. This is true even of grout fluid 9, which is a bentonite-only product.

Hydraulic conductivity was also tested using ASTM procedure D5084, which produced the following results. Again, the results show that grout fluids 4-7 exceed the standard permeability requirement of $1 \times 10^{-7}$ cm/s, and the results show an even lower (and better) permeability than in Table 1.

TABLE 2

ADDITIONAL PERMEABILITY TESTING FOR FLUIDS 4-7

| Fluid | Hydraulic Conductivity (cm/s) |
|---|---|
| 4 | $2.93 \times 10^{-8}$ |
| 5 | $6.39 \times 10^{-8}$ |
| 6 | $1.89 \times 10^{-8}$ |
| 7 | $3.32 \times 10^{-8}$ |

Example 2

Viscosity Tests

Viscosity data for grout fluids 4-6 was collected by measuring the 300 RPM reading every minute for 5 minutes using a FANN 35A rotational viscometer. After 10 minutes, the viscometer was turned on at 3 RPM and the reading for grout fluids 4-6 was taken. The highest number deflected on the viscometer was the gel strength. The gel strength provides an indication of gelation of the grout fluid after remaining static over a given amount of time. The lower the number compared to the 300 RPM readings, the slower the grout fluid sets, and the higher the number, the faster the grout fluid sets. The results are provided in Table 3. All the readings indicate that the grout fluid remains a fluid and stays pumpable.

TABLE 3

Viscosity Readings for Fluids 4-6

| 300 RPM Readings | Fluid 4 (cP) | Fluid 5 (cP) | Fluid 6 (cP) |
|---|---|---|---|
| 0 minute | 70 | 61 | 25 |
| 1 minute | 77 | 68 | 29 |
| 2 minutes | 81 | 72 | 32 |
| 3 minutes | 84 | 74 | 33 |
| 4 minutes | 87 | 77 | 33 |
| 5 minutes | 88 | 80 | 34 |
| 10 minute gel strength, lb/100 ft$^2$ | 57 | 59 | 65 |

Example 3

Set Tests

The set of grout fluids 1-9 was determined by pouring a sample into a plastic pint container and allowing it to rest for a maximum of 24 hours. After the 24 hours, the sample was inverted. If the grout fluid moved or flowed like a liquid, it failed to set. If the grout fluid did not flow, the grout fluid was considered as set. All the grout fluids passed the set evaluation, i.e., all the grout fluids set within 24 hours.

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

What is claimed is:

1. A method of using a grout fluid, which comprises:
   placing a geothermal conduit in at least one hole in the earth;
   providing a grout fluid consisting essentially of water and a bentonite-based grout, wherein the bentonite-based grout consists essentially of from about 30 to about 40 weight percent (wt %) calcium carbonate based on a total weight of the bentonite-based grout, a bentonite, one or more grout-setting modifiers, and one or more thermally conductive materials, and excludes cementitious materials that (i) when mixed with a liquid form a plastic paste and harden or (ii) harden under dry conditions;
   introducing the grout fluid into a space between the geothermal conduit and sidewalls of the at least one hole so that the grout fluid is in contact with the geothermal conduit;
   after introducing the grout fluid, allowing the grout fluid to set to fix the geothermal conduit to the at least one hole, wherein after setting, the grout fluid has a hydraulic conductivity of between about $1 \times 10^{-7}$ cm/s and about $1 \times 10^{-9}$ cm/s, and
   heating or cooling a heat transfer fluid in the geothermal conduit by respectively transferring heat through the set grout fluid from the earth to the heat transfer fluid or vice versa.

2. The method of claim 1, wherein the bentonite consists of sodium bentonite.

3. The method of claim 1, wherein the one or more grout-setting modifiers are selected from ammonium sulfate, potassium chloride, sodium chloride, partially hydrolyzed polyacrylamide, or a combination thereof.

4. The method of claim 3, wherein the one or more grout-setting modifiers are selected from potassium chloride, ammonium sulfate, or a combination thereof.

5. The method of claim 1, wherein the one or more thermally conductive materials are selected from a silicate, a carbon-based material, a metal particulate, or a combination thereof.

6. The method of claim 1, wherein the bentonite consists essentially of sodium bentonite, wherein the one or more grout-setting modifiers consists essentially of potassium chloride and ammonium sulfate, and wherein the bentonite-based grout thus consists essentially of the calcium carbonate, the sodium bentonite, the potassium chloride, the ammonium sulfate, and the one or more thermally conductive materials.

7. The method of claim 1, wherein the bentonite consists essentially of sodium bentonite, wherein the one or more grout-setting modifiers consists essentially of ammonium sulfate, and wherein the bentonite-based grout thus consists essentially of the calcium carbonate, the sodium bentonite, the ammonium sulfate, and the one or more thermally conductive materials.

8. The method of claim 1, wherein the grout fluid has a viscosity of less than about 100 cp within 5 minutes of the grout fluid being prepared.

9. The method of claim 1, wherein the grout fluid sets within 24 hours after the grout fluid is introduced into the at least one hole.

10. The method of claim 1, wherein the one or more thermally conductive materials are selected from silicates, metal particulates, or a combination thereof.

11. The method of claim 1, wherein the bentonite-based grout further excludes thermally insulative materials.

12. The method of claim 1, wherein the grout fluid comprises less than or equal to 1 pound of the bentonite-based grout per gallon of water.

13. A method of using a grout fluid, which comprises:
   providing a grout fluid consisting essentially of water and a bentonite-based grout, wherein the bentonite-based grout consists of from about 30 to about 40 weight percent (wt %) calcium carbonate based on a total weight of the bentonite-based grout, a bentonite, and one or more grout-setting modifiers, and excludes cementitious materials that (i) when mixed with a liquid form a plastic paste and harden or (ii) harden under dry conditions;
   introducing the grout fluid into a borehole in the earth so that the grout fluid is in contact with sidewalls of the borehole and fills the borehole; and
   allowing the grout fluid to set in the borehole, wherein after setting, the grout fluid has a hydraulic conductivity of between $1 \times 10^{-7}$ cm/s and $1 \times 10^{-9}$ cm/s.

14. The method of claim 13, wherein the bentonite consists of sodium bentonite.

15. The method of claim 13, wherein the one or more grout-setting modifiers are selected from ammonium sulfate, potassium chloride, sodium chloride, partially hydrolyzed polyacrylamide, or a combination thereof.

16. The method of claim 15, wherein the one or more grout-setting modifiers are selected from potassium chloride, ammonium sulfate, or a combination thereof.

17. The method of claim 13, wherein the bentonite consists of sodium bentonite, wherein the one or more grout-setting modifiers consist of potassium chloride, ammonium sulfate, or a combination thereof, and wherein the bentonite-based grout thus consists of the calcium carbonate, the sodium bentonite, and the potassium chloride, the ammonium sulfate, or the combination thereof.

18. The method of claim 13, wherein introducing the grout fluid into the borehole comprises introducing the grout fluid into an annulus between the borehole and a casing.

19. The method of claim 13, wherein the grout fluid has a viscosity of less than about 100 cp within 5 minutes of the grout fluid being prepared.

20. The method of claim 13, wherein the grout fluid sets within 24 hours after the grout fluid is introduced into the at least one hole.

21. The method of claim 13, wherein the grout fluid comprises less than or equal to 1 pound of the bentonite-based grout per gallon of water.

22. A method of using a grout fluid, which comprises:
providing a grout fluid consisting essentially of water and a bentonite-based grout, wherein the bentonite-based grout consists of from about 30 to about 40 weight percent (wt %) calcium carbonate based on a total weight of the bentonite-based grout, sodium bentonite, ammonium sulfate, and one or more thermally conductive materials and excludes cementitious materials that (i) when mixed with a liquid form a plastic paste and harden or (ii) harden under dry conditions;
introducing the grout fluid into a borehole in the earth so that the grout fluid is in contact with sidewalls of the borehole and fills the borehole; and
allowing the grout fluid to set in the borehole, wherein after setting, the grout fluid has a hydraulic conductivity of between $1\times10^{-7}$ cm/s and $1\times10^{-9}$ cm/s.

23. The method of claim 22, wherein the one or more thermally conductive materials are selected from silicates, metal particulates, or a combination thereof.

\* \* \* \* \*